United States Patent
Hoffmuller et al.

(10) Patent No.: US 9,248,689 B2
(45) Date of Patent: Feb. 2, 2016

(54) METHOD FOR THE PRODUCTION OF SECURITY ELEMENTS HAVING REGISTERED LAYERS OF DESIGNS

(75) Inventors: Winfried Hoffmuller, Bad Tolz (DE); Patrick Renner, Reichersbeuern (DE); Manfred Heim, Bad Tolz (DE); Theodor Burchard, Gmund (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 1270 days.

(21) Appl. No.: 13/055,515

(22) PCT Filed: Aug. 4, 2009

(86) PCT No.: PCT/EP2009/005643
§ 371 (c)(1),
(2), (4) Date: Jan. 24, 2011

(87) PCT Pub. No.: WO2010/015384
PCT Pub. Date: Feb. 11, 2010

(65) Prior Publication Data
US 2011/0115212 A1    May 19, 2011

(30) Foreign Application Priority Data
Aug. 5, 2008  (DE) .................. 10 2008 036 480

(51) Int. Cl.
*B42D 25/43* (2014.01)
*B42D 25/324* (2014.01)
(Continued)

(52) U.S. Cl.
CPC ................ *B42D 25/43* (2014.10); *B42D 25/29* (2014.10); *B42D 25/324* (2014.10);
(Continued)

(58) Field of Classification Search
CPC .. B42D 25/324; B42D 25/328; B42D 25/445; B42D 25/455
See application file for complete search history.

(56) References Cited

U.S. PATENT DOCUMENTS

| 5,354,099 | A  |   | 10/1994 | Kaule et al. |         |
|-----------|----|---|---------|--------------|---------|
| 7,029,757 | B1 | * | 4/2006  | Levy ............... | 428/458 |

(Continued)

FOREIGN PATENT DOCUMENTS

| DE | 102004035979 | 2/2006  |
| DE | 102006021429 | 11/2007 |
| DE | 102007055112 | 7/2008  |
| GB | 2429187      | 2/2007  |
| WO | 9211142      | 12/1991 |

(Continued)

OTHER PUBLICATIONS

Search Report in PCT/EP2009/005643, Feb. 3, 2010.

*Primary Examiner* — Kyle Grabowski
(74) *Attorney, Agent, or Firm* — Workman Nydegger (57) ABSTRACT

The present invention relates to a method for producing a security element (1), to a security element (1) obtainable by the method according to the invention, to transfer materials having the security elements according to the invention, and to objects of value secured with the security elements according to the invention. The security element (1) according to the invention has two functional layers (12, 22) which are bonded together by means of a resist layer (30). The resist layer (30) has a pattern which is employed to generate a congruent pattern in the first functional layer (12). Then the pattern of the resist layer (30), and thus also of the first functional layer (12), is exactly reproduced in the second functional layer (22). This is achieved by bonding the second functional layer (22) in the form of the pattern of the resist layer (30). The non-bonded areas of the second functional layer (22) are removed, thereby forming negative writing.

8 Claims, 7 Drawing Sheets

(51) Int. Cl.
  *B42D 25/445* (2014.01)
  *B42D 25/29* (2014.01)
  *B42D 25/328* (2014.01)
  *B42D 25/47* (2014.01)

(52) U.S. Cl.
  CPC .......... *B42D 25/445* (2014.10); *B32B 2425/00* (2013.01); *B42D 25/328* (2014.10); *B42D 25/47* (2014.10); *B42D 2033/18* (2013.01); *B42D 2035/16* (2013.01); *B42D 2035/36* (2013.01); *Y10T 156/17* (2015.01)

(56) References Cited

U.S. PATENT DOCUMENTS

| | | | |
|---|---|---|---|
| 2005/0104364 A1* | 5/2005 | Keller et al. | 283/72 |
| 2005/0170259 A1* | 8/2005 | Holmes | 430/1 |
| 2010/0045024 A1* | 2/2010 | Attner et al. | 283/72 |

FOREIGN PATENT DOCUMENTS

| WO | 2004020217 | 3/2004 |
|---|---|---|
| WO | 2007107235 | 9/2007 |

* cited by examiner

METHOD FOR THE PRODUCTION OF SECURITY ELEMENTS HAVING REGISTERED LAYERS OF DESIGNS

This invention relates to a method for producing a security element having two mutually registered motif layers, in particular motif layers with symbols that are visually recognizable in transmitted light and preferably also in incident light, to a security element obtainable by means of the method, to the security element formed as a transfer element, to the use of the security element or transfer element for product protection, to an object of value equipped with the security element, and to a method for producing such an object of value.

Objects of value, in particular value documents such as bank notes, shares, identity cards, credit cards, deeds, checks, and other papers at risk of forgery, such as identification documents of the widest range of kinds, but also branded articles and packages of branded articles, are often equipped for safeguarding purposes with security elements that make it possible to check their authenticity and at the same time serve as protection from unauthorized reproduction. The security elements can have for example the form of security threads or stickers or some other form that can be incorporated into or applied to an object of value or a security paper, whereby an "object of value" according to the present invention is any object worth being protected from forgery, in particular a value document, while a "security paper" is the value-document precursor not yet fit for circulation.

Security elements are typically multilayer elements having several functional layers. Functional layers are quite generally layers having some properties or other that can be detected visually or by machine. Hence, functional layers contain for example dyes, luminescent substances, thermochromic substances, liquid crystals, interference pigments, electrically conductive substances, magnetic substances, light-diffractive or light-refractive structures, or combinations thereof. The functional layers are usually formed as geometrical or figurative patterns or motifs, i.e. within a layer there are functional areas with the detectable property (for example luminescence) and gaps therebetween. When several functional layers are arranged one over the other, it is normally desirable that the functional areas and the gaps in the individual functional layers are formed in exact register, i.e. with high register accuracy, and with sharply contoured edges between the functional areas and the gaps one above the another. In this manner it is possible to hide one functional layer under another, for example magnetic substances under an ink layer, or to produce security elements with several functional layers and "negative writing".

Security elements with negative writing have a transparent substrate with at least one non-transparent coating which has gaps (the negative writing). Said gaps can have arbitrary shapes, for example letters, numbers or patterns of any kind, in particular line patterns. Therefore, the term "negative writing" employed in this application comprises gaps of arbitrary shape, i.e. any non-all-overness in a non-transparent coating. The more transparent, i.e. the more light-transmissive, the carrier substrate is, the more pronounced the contrast is between coated and uncoated areas. With very transparent substrates the negative writing is clearly recognizable in incident light, with less transparent substrates only in transmitted light. When such a security element with negative writing has two different functional layers, for example a motif in the form of a gold-colored metallic coating and thereon the same motif as red printing ink, said motif appears to the viewer gold-colored when seen from one side, and red when seen from the other side.

Such multilayer motifs are difficult to imitate on account of the high register accuracy required. In particular motifs with negative writing offer good protection from forgery, because inaccuracies upon production are recognizable especially easily in transmitted light, and "primitive" attempts at forgery, for example copying on color copiers, are immediately recognizable even to the unpracticed eye.

The forgery resistance is the higher, the finer the structures in the functional layers with the mutually registered motifs are. However, forming extremely fine structures with sharp contours and in perfect mutual register is a challenge even for authorized manufacturers. There are a number of known methods that are supposed to make it possible to form gaps in several superposed functional layers in exact register, i.e. congruently in all layers.

From WO 92/11142 it is known to generate negative writing in functional layers by means of printing inks activatable by the action of heat. The printing inks are printed on in the form of the desired negative writing under the functional layers and contain waxes or foaming additives which, upon heating, soften or split off a gas and thereby generate foam structures. Thus, the adhesion is reduced in the areas printed with the activatable printing ink, and the functional layers can be removed mechanically in said areas.

DE 10 2007 055 112 discloses a method for registered, i.e. congruent, formation of negative writing in several functional layers with the help of a printing ink printed on under the functional layers in the form of the negative writing to be formed, said ink containing a constituent which, upon irradiation or upon heating or upon contact with a wash liquid, causes a process which leads to a force being exerted by the printing ink on the superjacent coating so as to make the coating break open. Said force can be exerted by a gas which is generated by constituents of the printing ink when the latter come in contact with wash liquid, are irradiated and/or heated, or by a swelling agent in the printing ink, which swells up upon contact with a wash liquid. Once the multilayer coating is broken open, it is relatively easily accessible to being washed out with wash liquid.

The stated methods work satisfactorily provided no very fine structures are to be formed. The problem of forming congruently patterns and negative writing in several layers with high register accuracy and contour sharpness has hitherto not been solved satisfactorily in particular for fine structures, however.

Hence, it is an object of the present invention to provide a method for producing security elements that makes it possible to form patterns or motifs that are congruent at least in certain areas in two superposed layers.

It is in particular an object of the present invention to provide such a method that makes it possible to form patterns or motifs that are congruent at least in certain areas with sharp contours and high register accuracy.

It is furthermore an object of the present invention to provide such a method wherein the patterns or motifs to be formed have very fine structures.

It is also an object of the present invention to provide a security element with two motif layers with mutually corresponding patterns or motifs which have a high register accuracy.

It is further an object of the present invention to provide such a security element wherein the motif layers have very fine structures and are formed with sharp contours.

It is furthermore an object of the present invention to provide such security elements in the form of transfer elements, and to provide security papers and objects of value having the security elements or transfer elements according to the invention and methods for producing the security papers and the objects of value.

Special embodiments of the present invention are stated in the respective dependent claims.

The basic idea of the present invention consists in employing an adhesive resist layer to form congruent patterns in two functional layers. For this purpose, a resist layer in the form of the desired pattern is applied to the first functional layer. The pattern is exactly reproduced in the first functional layer by removing the areas of the first functional layer not protected by the resist. Subsequently, the pattern is reproduced in the second functional layer by bonding the second functional layer to the resist. The bonding takes place only in the areas where the second functional layer has contact with the resist. The non-bonded areas of the second functional layer are then removed while the bonded areas cannot be removed, thereby causing an exact reproduction of the pattern of the resist layer and of the first functional layer to arise in the second functional layer.

The security element according to the invention is produced from two partial elements. A first partial element consists at least of a carrier substrate and a functional layer, preferably with gaps therein. Further layers can be present. The functional layer can also be constructed from several single layers.

The carrier substrate of the first security-element partial element is preferably a foil, for example of polypropylene, polyethylene, polystyrene, polyester, in particular polycarbonate or polyethylene terephthalate. Transparent or translucent foils are particularly preferred. Upon a use of such foils, the gaps formed in exact register can be recognized clearly as negative writing in the individual functional layers.

A great advantage of the method according to the invention consists in the fact that it does without an exposure step, because the resist can be applied in the form of the desired motif by per se known methods. Therefore, the method according to the invention makes it possible to produce precisely registered functional layers without exposure steps, whereby the security elements according to the invention are nevertheless characterized by a very great forgery resistance.

For producing the first security-element partial element, a functional layer is first formed on the carrier substrate. The functional layer can basically be of any type that is employed in security elements. Examples to be mentioned are metal layers of for example aluminum, iron, copper, gold, nickel, etc., metal alloys, or layers of metallic effect inks, layers with color pigments or fluorescence pigments, liquid crystal layers, coatings with a color shift effect, layer combinations such as a color-shift-effect layer underlaid with a certain color, layers with machine-detectable features, for example with magnetic pigments, which can optionally be hidden under a cover layer.

The application of the functional layers is effected by known methods which are suitable for the particular functional layer, for example by physical vapor deposition (PVD) in the case of metals, or by printing in the case of color pigments or fluorescence pigments. Application can be effected all over or only in partial areas.

The functional layer can be formed directly on the carrier substrate, or there can be provided one or several intermediate layers. For some functional layers, intermediate layers are absolutely necessary, for example when the motif of the functional layer involves a metallized hologram, Kinegram, Pixelgram or another metallized diffractive structure. In such a case, an embossing lacquer layer is first applied, and the desired diffractive structure embossed in the embossing lacquer layer, before or after the metallization. Liquid crystal layers also normally require an intermediate layer, which ensures an appropriate orientation of the liquid crystals. Suitable orientation layers can be for example diffractive structures embossed in embossing lacquer layers. Alternatively, the carrier foil can optionally also be treated suitably.

According to a preferred embodiment of the present invention, one of the motif layers is a metallized diffractive structure such as a metallized hologram; particularly preferably, a further motif layer is also a metallized diffractive structure, such as a metallized hologram. When holograms are spoken of hereinafter, it will be understood that the same also holds for other diffractive structures and refractive structures as well as for so-called "matt structures" (grating images with achromatic grating areas) as are defined and described e.g. in WO 2007/107235 A1 (see in particular claim 1).

As mentioned above, there is to be provided in the case of holograms an embossing lacquer layer which contains the desired structural information embossed therein. The structural information is transferred as well upon bonding to the second security-element partial element. Holograms or structural information in general can be the same or different in the functional layers of a security element according to the invention. Materials for embossing lacquer layers are known to a person skilled in the art. Suitable embossing lacquers are disclosed for example in DE 10 2004 035 979 A1, which discloses heat seal lacquers that can likewise be used as embossing lacquers.

There is applied to the functional layer of the first security-element partial element, in a further step, a resist. A resist is understood within the framework of the present application to be any material that permits the carrying out of the method according to the invention for producing a security element according to the invention. In particular, such a resist material must be able to protect areas of the first functional layer from removal, in order to generate first gaps in the first functional layer only in the unprotected areas. Furthermore, the resist material must have a sufficient adhesiveness to bond together first and second functional areas. Therefore, suitable resist materials are compounds that can protect areas of the first functional layer from removal and are sufficiently adhesive. Hence, suitable resist materials are e.g. various thermoplastic materials. It is preferable to employ thermoplastic resist lacquers. Examples of resist lacquers according to the invention will be given below.

The resist is applied, for example printed on, preferably in the form of the desired pattern. Printing methods suited therefor are known to the person skilled in the art.

Subsequently, the functional layer of the first security-element partial element, i.e. the first functional layer, is structured, i.e. the pattern of the resist layer is transferred into the first functional layer. The transfer is effected in such a fashion that the areas of the first functional layer not protected by resist are removed, in the case of metallic functional layers for example by etching agents such as lyes or acids, in the case of printing inks for example by washing out with suitable solvents. Suitable methods are known to the person skilled in the art. The first security-element partial element now possesses a pattern that has congruent functional areas and resist areas and likewise congruent gaps between said areas. The pattern can form for example a coding or a geometrical or figurative motif.

Next, the second security-element partial element is produced.

The second security-element partial element has, like the first security-element partial element, at least two layers, namely a carrier substrate and a functional layer formed thereon. Additionally, further layers can be present, or must be present, as stated hereinabove for the first security-element partial element.

Quite generally, the same applies to the materials, structure and production of the layers of the second security-element partial element as to the first security-element partial element, whereby it must be heeded, however, that no gaps are formed in the functional layer, or the functional layer sequence. The gaps are only generated by interaction with the first security-element partial element or the resist layer thereon. Moreover, the carrier substrate of the second security-element partial element is later detached, e.g. peeled off by separation winding, together with parts of the functional layer of the second security-element partial element (e.g. the parts of the functional layer that, in the assembled security element, are arranged over gaps in the functional layer of the first security-element partial element), while the carrier substrate must be strippable from other parts of the functional layer of the second security-element partial element (e.g. the parts that, in the assembled security element, are arranged over functional areas of the first security-element partial element). Hence, it is necessary that the functional layer possesses only low adhesion to the carrier substrate.

The necessary low adhesive force is already obtained, in many functional layer materials, in particular metallizations, merely by doing without adhesion-promoting measures between carrier substrate and functional layer. It is otherwise customary to take adhesion-promoting measures between the individual layers of a security element, and the corresponding precautions are known to a person skilled in the art.

When the adhesive force between carrier substrate and functional layer is too high, it can be reduced by treating the carrier substrate with suitable additives. For example, the carrier substrate can be washed off with water and/or solvents with or without suitable additives. Suitable corresponding additives are for example surface-active substances, defoamers or thickeners. Additives can also be incorporated into the carrier substrate itself. Alternatively, adhesion-reducing layers can be provided under the functional layer. The materials chosen for the adhesion-reducing layers are ones with surfaces on which relatively poor adhesion is known to usually occur, for example siliconizations, layers containing release additives (e.g. Byk 3500), waxes, cured UV lacquers, metallizations, untreated foils such as PET. By coordinating the surface energy conditions of the carrier substrate or the adhesion-reducing layer and the functional layer to be stripped, it is possible to attain an easy strippability of the functional layer and thus to generate the desired pattern in the functional layer of the second security-element partial element.

Similar considerations apply to any intermediate layers present between the carrier substrate and the functional layer, for example embossing lacquer layers for a hologram. If such an embossing lacquer layer or other intermediate layer is to be removed together with the carrier substrate, the adhesive force between the intermediate layer and the functional layer, i.e. for example between the embossing lacquer layer and a metallization applied thereto, must accordingly be low. In the case of an excessive adhesive force, the intermediate layer is to be treated with the stated additives, or an adhesion-reducing layer to be provided.

If a treatment of the carrier substrate or of an intermediate layer with adhesion-reducing additives is performed, residues of the additives can remain on the functional layer after detachment of the carrier substrate or of the intermediate layer. Said residues can normally be easily washed away with an aqueous solution whose pH is adjusted suitably and which can optionally also contain surfactants. A wash with solvents is also possible. In stubborn cases it is also possible to work with high-pressure nozzles and/or mechanical support (felts, brushes), but this is usually unnecessary. Small additive residues can also be "burned away" by a corona treatment. Also, in many cases it is also possible to do completely without removing additive residues. Suitably formulated protective lacquers can also adhere sufficiently to "additive-loaded" functional layers.

Now the first security-element partial element, which has a functional layer with functional areas and gaps, and the second security-element partial element, which has a functional layer substantially without gaps, are interconnected using the resist layer located on the functional areas of the first security-element partial element. The second security-element partial element is so placed onto the resist layer that its functional layer contacts the resist layer. The two partial elements are pressed together, optionally under elevated temperature, thereby bonding the resist layer to the functional layer of the second security-element partial element. Because the resist areas correspond in dimension and form to the functional areas of the functional layer of the first security-element partial element, the bonding to the functional layer of the second security-element partial element is effected in such a way that it exactly reproduces the pattern of the functional layer of the first security-element partial element. Suitable bonding conditions for thermoplastic resist lacquers are typically about 60° C. to 160° C. and a line pressure of typically 0.1 N/mm to 15 N/mm, particularly preferably of approx. 5 N/mm.

Finally, the carrier foil of the second security-element partial element is removed, optionally together with intermediate layers between carrier foil and functional layer, whereby the functional layer is also removed in the non-bonded areas, while it naturally cannot be removed in the bonded areas, resulting in a security element with two fully mutually congruent patterns. The unsharpnesses upon separation are less than 10 µm. The second motif layer can optionally be covered with a protective layer. Thus, it is possible to form structures with a width of about 50 µm or less in congruent and sharp-edged fashion.

Because it is not always possible to bond the first security-element partial element and the second security-element partial element together by means of resist lacquer directly after production, it is advantageous when prepared elements can be kept in stock. A certain waiting time is also advantageous insofar as the aging increases the robustness of the resist. For this purpose it is necessary that the security-element partial elements can be stacked or wound. To prevent the stacked or wound resist lacquer-coated security-element partial elements from bonding together, the coated security-element partial elements should be dried well. Moreover, there should be employed resist materials that do not tend to form a block at ambient temperature, i.e. are tack-free. The presence of tack-freeness can be checked by the following test: coated foil pieces of about 100 cm$^2$ are stacked and loaded with a weight of 10 kg and stored for 72 hours at 40° C. If the foil pieces can be easily separated from each other thereafter without damage to the coatings, the coating is to be considered tack-free. Under elevated pressure and elevated temperature (approx. 100° C. to 160° C.) substrates coated with the resist lacquers can be bonded to other substrates. According to the invention it is possible to use the following resist lacquers, partly even tack-free resist lacquers. The following formulations are understood to be merely exemplary and not restrictive.

| Product | wt. % |
| --- | --- |
| VMCH (vinyl chloride copolymer with acid groups, manufacturer: DOW) | 20% |
| Ethyl acetate | 80% |
| VMCA (vinyl chloride copolymer with acid groups, manufacturer: DOW) | 18% |
| Plasticizer (e.g. phthalates, citric acid ester[1]) | 2% |
| MEK (methyl ethyl ketone, 2-butanone) | 80% |
| H15/45M (vinyl chloride copolymer with acid groups, manufacturer: Wacker) | 18% |
| Plasticizer (e.g. phthalates, citric acid ester[1]) | 2% |
| MEK (methyl ethyl ketone, 2-butanone) | 80% |
| VMCH (vinyl chloride copolymer with acid groups, manufacturer: DOW) | 8.35% |
| VYHH (vinyl chloride copolymer, manufacturer: DOW) | 8.35% |
| Plasticizer (e.g. phthalates, citric acid ester[1]) | 3.30% |
| MEK (methyl ethyl ketone, 2-butanone) | 80.00% |
| Pioloform BL 18 (polyvinyl butyral, manufacturer: Wacker) | 20% |
| Ethyl acetate | 40% |
| Ethanol | 40% |

[1])Examples of suitable plasticizers are: Citrofol B II (ATBC), Citrofol AH II (ATEHV), Citrofol B I (TBC) from Jungbunzlauer, Palatinol N from BASF.

If it is desired to bond the first security-element partial element and the second security-element partial element together at a temperature as low as possible, the first security-element partial element can, directly before bonding, be printed with a solvent, for example with cyclopentanone, or be subjected to a solvent-containing atmosphere. The resist lacquer takes up the solvent and becomes tacky or melts at lower temperature than in the dry state.

Embodiments of the security element according to the invention which have a reflective layer as functional layers or one of the functional layers can also be equipped very well with a so-called "polarization feature". This is understood to refer to security features utilizing polarization effects for securing authenticity. Light-reflective surfaces, for example metallized holograms, are coated all over or in certain areas with a double refractive layer, a so-called "phase delay layer". Phase delay layers are able to change the polarization and phase of passing light. The reason is that the light is decomposed into two mutually perpendicular polarization directions which pass the layer at different speed, whose phases are thus shifted relative to each other. The shift is of different size, depending on the type and thickness of the layer, and has different effects. A $\lambda/4$ layer, i.e. a layer that delays the light in one direction by a quarter of a wavelength relative to the direction perpendicular thereto, can turn linearly polarized light into circularly or elliptically polarized light, and circularly polarized light into linearly polarized again. The phenomenon of polarization and polarizing materials are known. A security element that utilizes polarization effects for securing authenticity is described for example in DE 10 2006 021 429 A1. Upon viewing in ambient light the areas with a phase delay layer of such a security element are hardly perceptible, while upon viewing in polarized light the areas with a phase delay layer become recognizable.

If light is made to fall through a polarizer on a light-reflective surface which is coated in certain areas with polarizing material, the light is reflected with different polarization in the coated and in the uncoated areas. Upon viewing through a polarizer one thereby observes light/dark contrasts. It is essential for achieving good optical effects that the light-reflective surface does not change the polarization state of the incident light uncontrolledly. Suitable reflective layers are layers of vapor-deposited metallizations, layers of metallic effect inks, layers with interference pigments or thin-film element layers. Highly refractive layers of for example $TiO_2$ or $SiO_2$ are also suitable as reflective layers.

In the present invention, metallic functional layers, for example metallized diffractive structures, are preferably combined with a polarization feature. The polarization feature can be executed for example as a $\lambda/4$ layer, be applied in motif form, all over or in certain areas, with only one orientation or with two or more different orientations. If the security element has reflective functional layers on both sides, both reflective functional layers can be equipped with the same or different polarization features. The transparent areas (gaps) are undisturbing. The carrier substrate should be isotropic or at least not show excessively strong dispersion in the optical range.

The functional layers which must be separated into areas remaining on the resist layer, on the one hand, and into areas to be removed with the carrier substrate, on the other hand, must not possess excessive internal strength in the horizontal direction (in the direction of extension of the resist layer) in order to guarantee a clean and sharp-edged separation. Functional layers whose internal strength is undesirably high are preferably applied in grid fashion. The edge of each grid point constitutes a rated breaking point, so that the transfer to the resist layer in this case comprises one grid point as the smallest unit. If a functional layer is constructed from several single layers, it can be sufficient to execute only one of the single layers as a stationary grid. Optionally, the transfer of the grid must be repeated with a further second security-element partial element (a further donor foil) in order to cover the resist lacquer with the second functional layer substantially all over.

According to an especially preferred embodiment of the present invention, the security elements have three different views to be perceived by the viewer: a front view in incident light (front incident-light view), a back view in incident light (rear incident-light view), and a view in transmission (transmitted-light view). Said different views can be achieved by equipping the functional areas of the first security-element partial element and of the second security-element partial element in each case with motifs that can be perceived only from one side (front or back), and moreover varying the functional areas, i.e. their superficial extent, such that the surface-area variation causes a further pattern to be formed, a so-called subpattern.

For example, the pattern perceived in front and back views can be formed by straight or wavy, parallel or crossing lines of a certain width with gaps therebetween. Said pattern can additionally be a carrier for a motif that is perceived primarily by the viewer in plan view, for example a first hologram visible in the front incident-light view, and a second hologram different therefrom which is perceived in the back incident-light view. Such an effect is to be achieved when the lines are formed by first and second functional areas that consist of metallizations with different holographic information.

To make a subpattern visible in the transmitted-light view, the lines are configured wider in certain places. The greater line width is hardly noticeable in plan view, but in transmitted light, when the motif information, such as the holograms, is no longer perceptible to the viewer, the superficial extent of the lines becomes the only recognizable information, and deviations in the line width are perceived as a subpattern. This modulation of line-like structural elements is known for generating halftone images. Reference is made in this connection to WO 2004/020217 A1, whose disclosure is made the subject matter of the present application to this extent. According to the present invention, the patterns of the functional layers can be formed from line-shaped structural elements, as are disclosed in WO 2004/020217 A1.

Instead of a second security-element partial element wherein the motif of the functional layer is a metallized hologram or another metallized diffractive structure, it is alternatively possible to employ a second security-element partial element which has a carrier substrate with a layer formed thereon which is suitable for forming a metallized hologram or another metallized diffractive structure. For example, there can be produced as the second security-element partial element a metal donor foil without embossing, which has a carrier substrate with a metal layer formed thereon. From said metal donor foil there is transferred, according to the hereinabove described method for producing a security element, the metal layer under pressure and temperature to the resist layer which is generated on the first security-element partial element. Subsequently, an embossing is carried out under pressure and temperature in order to form the metal layer to a metallized hologram or another metallized diffractive structure. The embossing tool used in this case can be for example an embossing cylinder, a normal embossed foil or a metallized embossed foil. The use of a metal donor foil without embossing as the second security-element partial element makes possible an optimal freedom in adjusting the metal adhesive force and a perfect uniformity, so that a metallization transfer is successful even at low temperatures.

The invention will hereinafter be explained more closely on the basis of drawings. It is pointed out that the present invention is by no means limited to the depicted functional layers, their specific spatial arrangement and sequence. It is instead possible to use arbitrary functional layers in arbitrary combinations, for example layers of printing inks, metallic effect inks, interference pigments, liquid crystal layers and combinations of layers, for example ink layers with layers of interference pigments thereon. The layers can be present in each case all over or in partial areas of the security elements. Moreover, further layers as are customary in the field of security elements can be contained in the security element structures, for example protective layers or release layers in the case of transfer elements, adhesion-reducing layers for easier detachment of the functional layer areas that are to remain on the resist layer, etc. It is evident that the additional layers must not disturb the method sequence. Further, it is pointed out that the depictions are of course not true to scale. In particular, the individual layers are depicted with strongly exaggerated height.

In the figures there are shown:

FIG. 1b the security element of FIG. 1a in plan view against a color-coordinated background, FIG. 2a to FIG. 2e the method sequence in the production of a security element according to the invention, illustrated by sections through the security element of FIG. 1a along the line A-A', FIG. 3a to FIG. 6d further embodiments of security elements according to the invention, illustrated with reference to selected production stages by sections as in FIGS. 2a to 2e, and FIG. 7a to FIG. 7d an alternative method sequence in the production of a security element according to the invention, illustrated by sections through the security element of FIG. 1a along the line A-A', there being employed instead of the second security-element partial element depicted in FIG. 2c the second security-element partial element depicted in FIG. 7a.

Figure 1A:
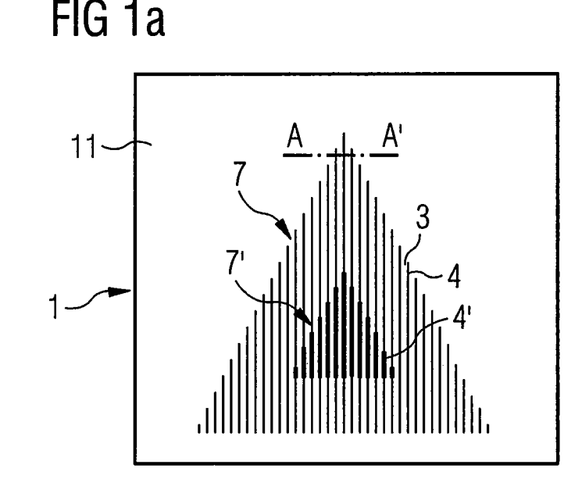
FIG. 1a a security element according to the invention in transmission view.

FIG. 1a shows a security element 1 according to the invention in a view in transmitted light. The security element 1 has at least the following layers: a transparent substrate 11, first and second functional layers (motif layers), and a resist layer which bonds the first and second functional layers. The two motif layers have the same size and form in this embodiment example and only partly cover the carrier substrate 11. The motif layers can of course also cover the carrier substrate all over. Moreover, one of the motif layers can only partly cover the other motif layer or partly overlap therewith.

In the embodiment shown in FIG. 1a of the security element according to the invention, the two motif layers form a triangular pattern 7 of lines 4, the lines 4 being formed from the functional areas, bonded by means of resist, of the functional layers (motif layers). The lines 4 are separated by gaps 3, the gaps 3 being formed by the congruent gaps in the functional areas and the resist layer. The lines 4 vary in their width y, thereby making perceptible in transmission through the security element a subpattern 7', in the shown embodiment a further triangle.

The functional areas of course need not necessarily be present in the form of parallel lines, but can have arbitrary other forms.

Which motif a viewer perceives in the front incident-light view and in the back incident-light view depends on the specific design of the functional areas of the first and second functional layers, and will be explained with reference to the following figures, which show nonrestrictive examples of motif layers and layer sequences.

Figure 1B:
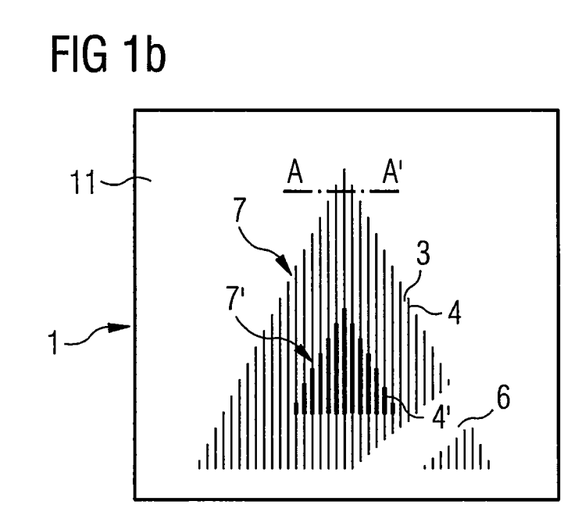

FIG. 1b shows a special embodiment of the security element depicted in FIG. 1a, wherein one of the functional layers is only partially formed. This embodiment will be explained more closely in connection with FIG. 5.

FIG. 2 illustrates the method sequence in the production of a security element 1 according to the invention. There is shown a section along the line A-A' of the security element depicted in FIG. 1a, it again being stressed, however, that the layer sequence is merely exemplary.

Figure 2A:
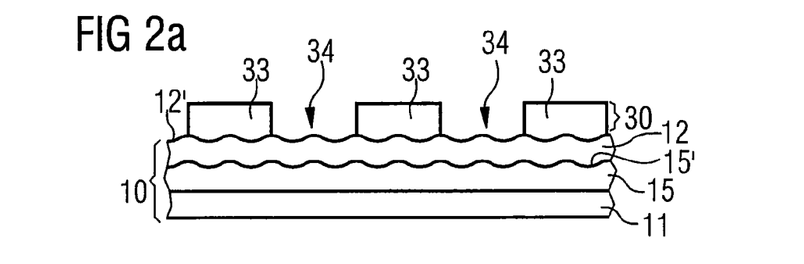

FIG. 2a shows a first security-element partial element 10, consisting of a first carrier substrate 11, for example a foil of PET, an embossing lacquer layer 15 applied thereto and having an embossed diffractive structure 15' with a gold-colored metallization. The metallization forms a first functional layer 12 on which there is in turn printed a layer 30 of thermoplastic resist lacquer in the form of a pattern with resist areas 33 and gaps 34 therebetween. The diffractive structure 15' continues within the functional layer as diffractive structure 12'.

Figure 2B:
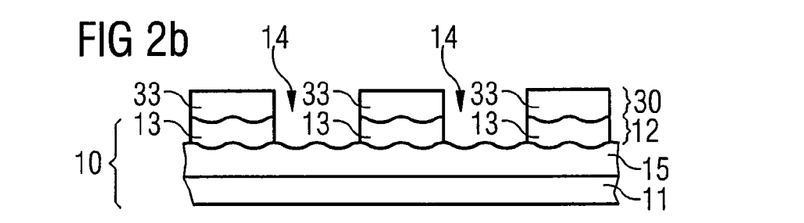

FIG. 2b shows the same representation as FIG. 2a, but after treatment with an etching agent. Through the etching the areas of the first functional layer 12 not protected by resist areas 33 were removed, while the areas of the first functional layer 12 protected by resist areas 33 were retained and form the first functional areas 13. The first functional areas 13 constitute an exact reproduction of the pattern of the resist areas 33.

Figure 2C:
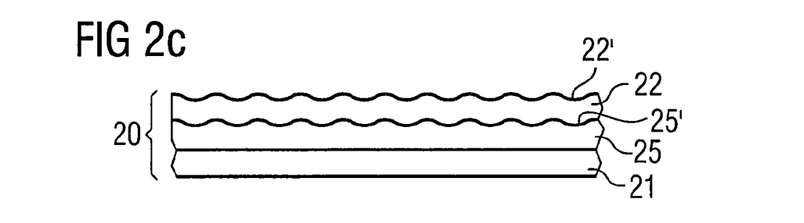

FIG. 2c shows a section through the second security-element partial element to be combined with the first security-element partial element 10. The second security-element partial element 20 consists of the second carrier substrate 21, the second functional layer 22 and an embossing lacquer layer 25 therebetween. In the embossing lacquer layer 25 there is embossed a diffractive structure 25' which continues within the second functional layer 22 as diffractive structure 22'. The second functional layer 22 involves a silver-colored metallization. The embossing lacquer 25 was washed off with an aqueous surfactant solution before application of the metallization 22, so that the metallization 22 adheres poorly to the embossing lacquer.

Figure 2D:
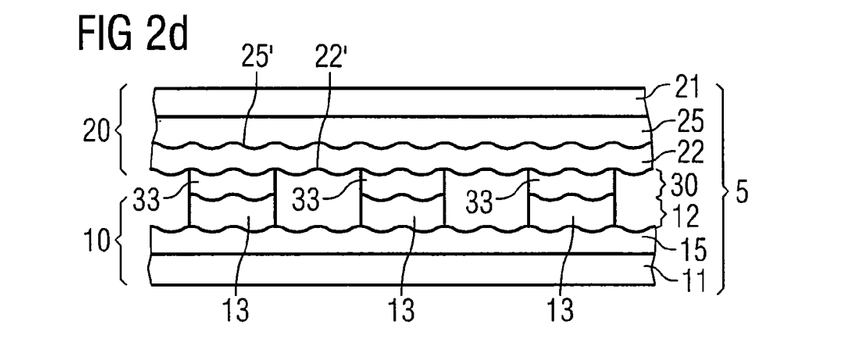

FIG. 2d shows how the first security-element partial element 10 from FIG. 2b and the second security-element partial element 20 from FIG. 2c are assembled to a composite 5.

The two partial elements are pressed together, thereby causing the diffractive structure 22' of the second functional layer 22 to be transferred into the resist areas 33, because the resist used is a deformable, preferably thermoplastic resist lacquer. By means of the resist areas 33 the first security-element partial element and the second security-element partial element are bonded together. With the thermoplastic resist lacquers preferably used, bonding is advantageously effected at elevated temperature.

The pressing together of the two security-element partial elements can be effected in single-stage or multistage fashion, i.e. the two partial elements are pressed against each other preferably at elevated temperature in a heating roll with one so-called calender roll (single-stage pressing) or several calender rolls (multistage pressing), or else the two partial elements are pressed against each other on several heating rolls which are each equipped with one or several so-called calender rolls (multistage pressing). Multistage pressing can lead to a particularly firm connection of the security-element partial elements, depending on the particular embodiment. Upon the use of several heating rolls it is also possible to realize temperature gradations during pressing.

Figure 2E:
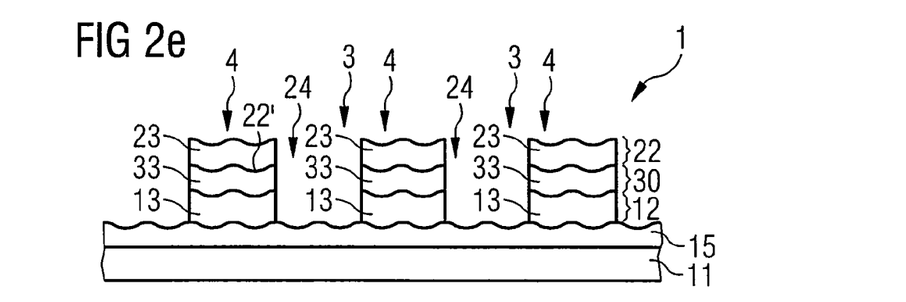

After bonding and optionally after a certain waiting period for cooling and for stabilizing the adhesive connection, the second carrier substrate 21 and the second embossing lacquer layer 25 are removed, for example by separation winding. The result is shown in FIG. 2e. Bonded to the first security-element partial element 10 were only the areas 23 of the second functional layer 22 that were in contact with resist areas 33. Said areas form the second functional areas 23 which constitute an exact reproduction of the pattern of the resist areas 33. The remaining areas of the second functional layer 22 were removed together with the second carrier substrate and the embossing lacquer layer, while the areas 23 of the second functional layer 22 bonded to the resist areas 33 were removed from the embossing lacquer layer.

The areas 13, 33 and 23 are in each case exactly congruent and form the lines 4 in the representation of FIG. 1a. The gaps 3 between the lines 4 are likewise exactly congruent and are formed by the gaps 14 in the first functional layer 12, the gaps 34 in the resist layer 30, and the gaps 24 in the second functional layer 22.

The lines 4 (which are formed by the first functional areas 13, the resist areas 33 and the second functional areas 23) are in each case the carrier of a diffractive structure, in the embodiment depicted in FIG. 2. The diffractive structures can be for example hologram structures, whereby different hologram structures are preferably present in the first functional areas 13 and the second functional areas 23. In this case, a viewer will recognize in the transmitted-light view the line pattern shown in FIG. 1a, in the front incident-light view (regarding the side of the first carrier substrate 11 as the front) the hologram of the first functional layer 12, and in the back incident-light view the hologram of the second functional layer 22.

As the second security-element partial element there can for example also be used a hot stamping foil. In this case, only the second carrier substrate 21 would be removed upon separation winding, while the embossing lacquer layer 25 would remain on the security element 1 formed. It can at the same time serve as a protective layer. Quite generally it is expedient to provide a protective layer (not shown in the figure) over the second functional areas or the second functional layer; in particular for this reason e.g. the diffractive structure 22' shown in FIG. 2e or the casting of the diffractive structure 25' in the functional layer 22 is covered, thus being inaccessible to forgery attacks.

Figure 3A:
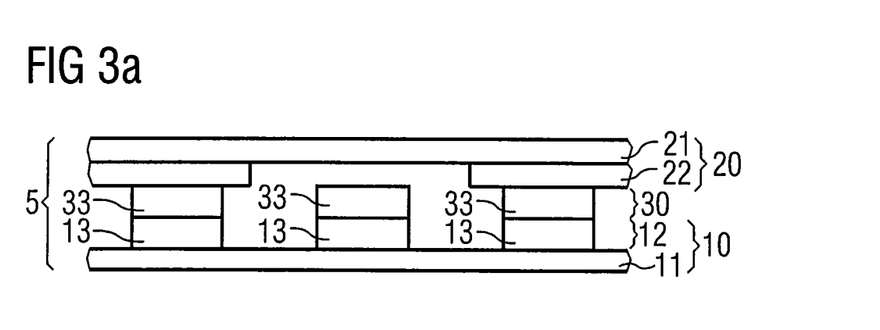
Figure 3B:
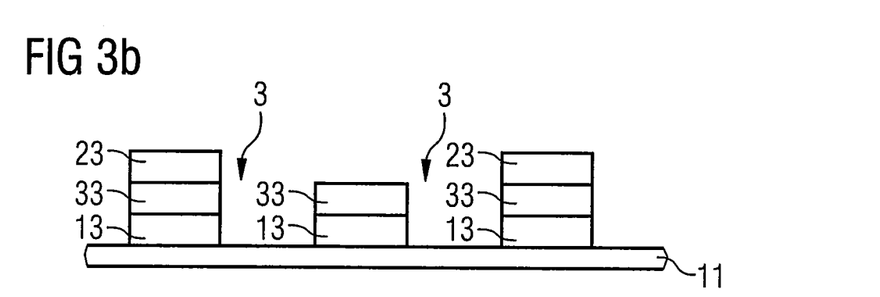
Figure 3C:
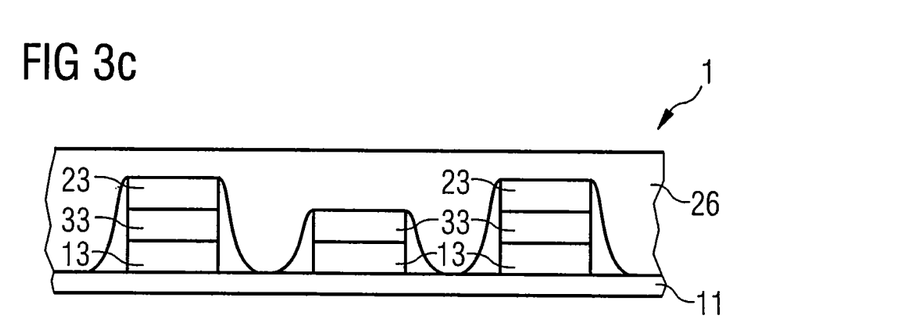

FIGS. 3a to 3c show sectional representations like FIG. 2, with FIG. 3a corresponding to the method stage of FIG. 2b, and FIG. 3b corresponding to the method stage of FIG. 2e. In the security element 1 depicted in FIG. 3, the first security-element partial element 10 consists of the first carrier substrate 11 with a gold-colored metallization 12. In the metallization 12 there are formed first functional areas 13, as explained in connection with FIG. 2. The second security-element partial element 20 consists of the second carrier substrate 21 with a silver-colored metallization 22 thereon. As evident from FIG. 3a, the metallization 22 is not formed all over, but covers the carrier substrate 21 only in certain areas. Thus, in the composite 5 comprising first security-element partial element 10 and second security-element partial element 20, not all resist areas 32 are covered with silver-colored metallization 22.

After bonding and detaching of the second carrier substrate 21 there results the structure shown in FIG. 3b. A viewer will see here in the transmitted-light view a line pattern as depicted in FIG. 1a, in the front incident-light view (through the first carrier substrate 11) a gold-colored line pattern (the first functional areas 13), and in the back incident-light view a line pattern of silver-colored lines (the second functional areas 23) and gold-colored lines (the first functional areas 13 visible through the colorless resist). Holographic motifs as in the security element of FIG. 2 are not recognizable here, because no embossed layers with a diffractive structure are provided.

It would of course also be conceivable to use a colored resist in the embodiment of FIG. 3. Then the viewer would recognize in the back incident-light view a line pattern of silver-colored lines (the second functional areas 23) and colored lines in the color used for the resist. If resists in different colors are used, the viewer would recognize in the back incident-light view a line pattern of silver-colored lines (the second functional areas 23) and different-colored lines in the colors used for the resists.

FIG. 3c shows the security element after coating with a protective layer 26. The protective layer 26 covers the second functional areas 23 and at least partly fills the gaps 3.

Figure 4A:
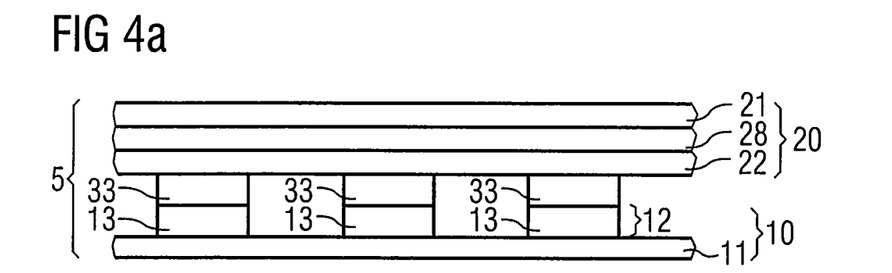
Figure 4B:
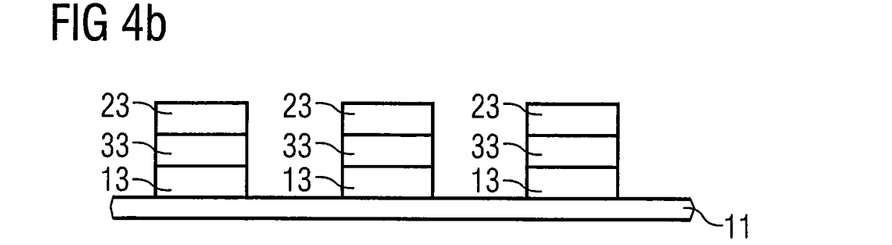
Figure 4C:
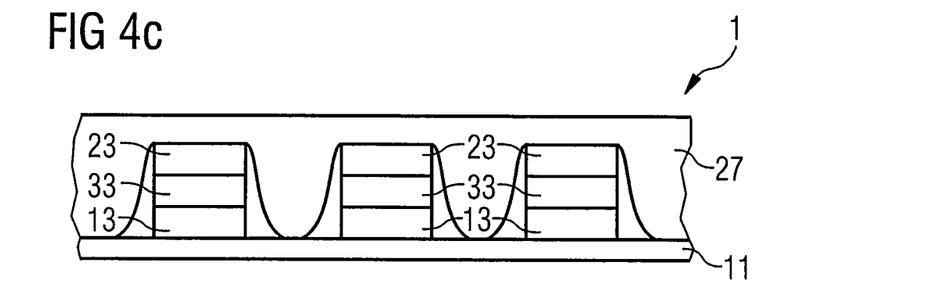

FIGS. 4a to 4c show sectional views like FIGS. 3a to 3c, i.e. method stages in the production of the security element as were explained in connection with FIG. 2d and FIG. 2e.

In the embodiment according to FIG. 4, the first security-element partial element 10 consists of a transparent carrier substrate 11 with a gold-colored metallization 12 in which first functional areas 13 are formed. Over the first functional areas 13, congruently therewith, there are located resist areas 33. The resist areas 33 consist of colorless resist lacquer. The second security-element partial element 20 consists of the second carrier substrate 21 with a functional layer 22 of black ink (for example Microlith black from Ciba in ethyl acetate), whereby for better strippability the black ink is not printed on the carrier substrate, but on an adhesion-reducing layer 28. The adhesion-reducing layer 28 is an aluminum metallization of the foil 21.

The first security-element partial element 10 and the second security-element partial element 20 are assembled to a composite 5, as shown in FIG. 4a. Under pressure and elevated temperature the functional layers 12 and 22 connect at the places where resist areas 33 are located therebetween. Upon separation of the foils the black ink adheres to the resist areas 33 and is removed in the remaining areas. There is obtained the structure shown in FIG. 4b.

Subsequently there is effected a coating with a layer with a color shift effect, for example a liquid crystal layer 27, in particular a layer of cholesteric liquid crystal material. The security element 1 coated with the liquid crystal layer 27 is depicted in FIG. 4c. In this embodiment, a viewer will see in the transmitted-light view a line pattern, in the front incident-light view (through the transparent carrier substrate 11) a gold-colored line pattern, namely, the first functional areas 13, and in the back incident-light view a line pattern with a color shift effect. The color shift effect is visible only in the areas that are located over the second functional areas 23 of black ink. In the remaining areas the color shift effect is not, or only very poorly, visible for lack of contrast. Instead of the gold-colored metallization 12 there can of course also be provided a silver-colored metallization 12 of e.g. chromium or aluminum, so that the viewer will perceive in the front incident-light view (through the transparent carrier substrate 11) a silver-colored line pattern.

Instead of a black printing ink there can advantageously also be employed a dark function ink, for example a magnetic ink. With a dark magnetic ink one can achieve a comparably good contrast, and one obtains the additional advantage of a machine-detectable security feature.

Figure 5A:
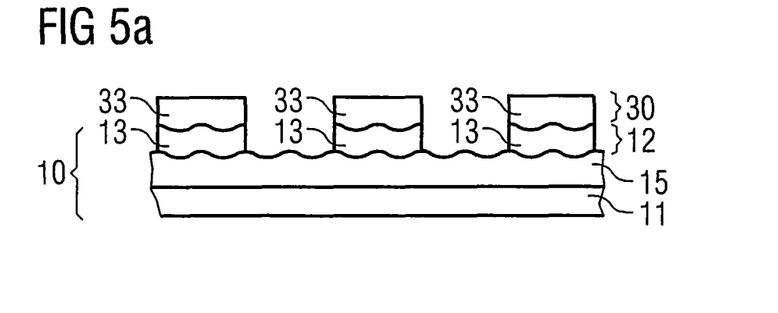

In FIG. 5 there is depicted a further embodiment of a security element 1 according to the invention. The structure, shown in FIG. 5a, of the first security-element partial element 10 is identical with the structure, shown in FIG. 2b, of the first security-element partial element 10.

Figure 5B:
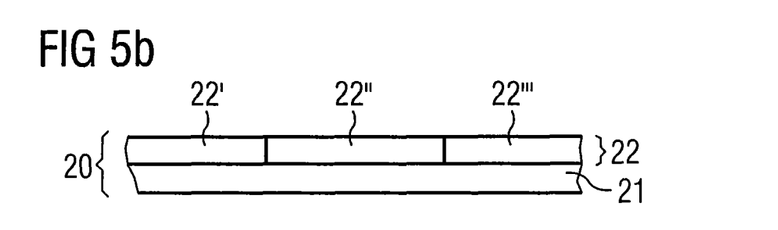

FIG. 5b shows a section through the second security-element partial element which consists, in this embodiment, of a carrier substrate 21 and a multicolored motif layer 22. The multicolored motif layer consists for example of different-colored partial areas 22', 22" and 22'" which together form a geometrical or figurative representation. The second motif layer 22 is printed on for example.

Figure 5C:
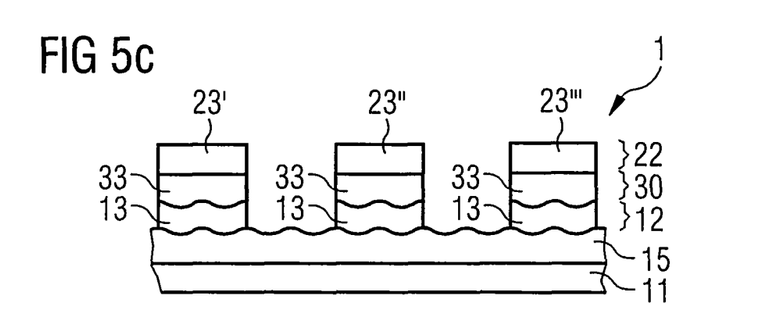

FIG. 5c shows the security element 1 after the first security-element partial element shown in FIG. 5a and the second security-element partial element shown in FIG. 5b were assembled to a composite 5 and the second carrier substrate 21 detached. With this security element, a viewer will recognize in the transmitted-light view again a line pattern, in the front incident-light view a holographic motif (generated by the first functional areas 13 with hologram structure information), and in the back incident-light view a multicolored motif (generated by the different-colored second functional areas 23', 23", 23'"). The multicolored motif can alternatively also be generated by bonding the first security-element partial element with resist areas 33, shown in FIG. 5a, successively to several second security-element partial elements with different-colored functional layers 22 and removing the carrier substrates 21. Upon the successive coating by means of several donor foils the coating 22 must be formed in each case only partially. Otherwise there result second functional areas 23', 23" and 23'" with mixed colors.

As a further alternative, a colored resist lacquer can be employed. A colored resist lacquer, wherein only a portion of the resist areas 33 is bonded to a different-colored motif layer 22, likewise leads to a multicolored motif (recognizable in the back incident-light view). It is further conceivable, as already mentioned with reference to FIG. 3, to employ resists with different colors, which likewise permits interesting and hard-to-forge security elements to be obtained.

The view of a security element according to the invention depicted in FIG. 1b is obtained by regarding the security element depicted in FIG. 5c in a plan view of the second functional layer 22, whereby the functional areas 23 in the area designated as 6 in FIG. 1b have the same color as the ground against which the security element is regarded. The remaining functional areas 23 have a color that stands out against the ground, while in the area 6 the motif of the second functional layer 22 is practically no longer perceptible in plan view. Hence, in the case of a white ground the area 6 should be formed as a white functional layer. This can be easily realized by employing a colored resist lacquer and bonding it only in certain areas to an opaque white second functional layer 22. Preferably, a protective layer is applied thereto. Colored resist lacquers are in general less preferable compared with colorless resist lacquers, however, because the colorant content impairs their adhesive force.

Figure 6A:
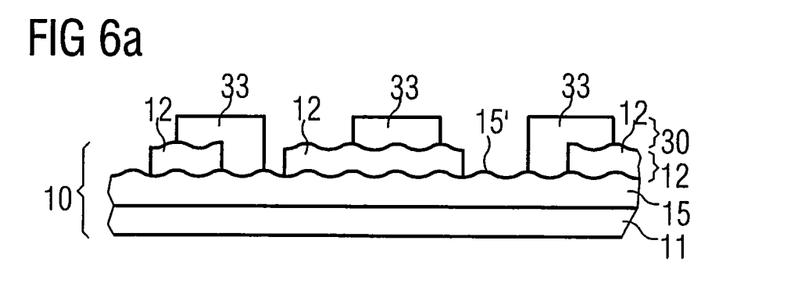
Figure 6B:
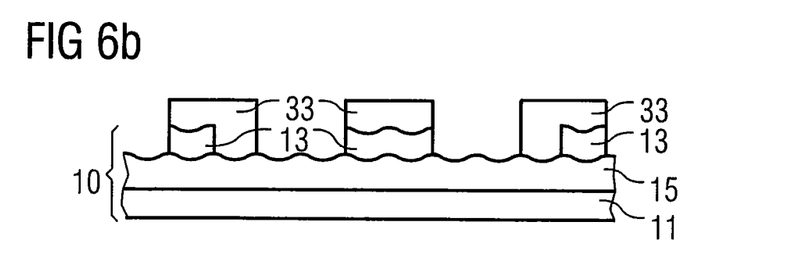
Figure 6C:
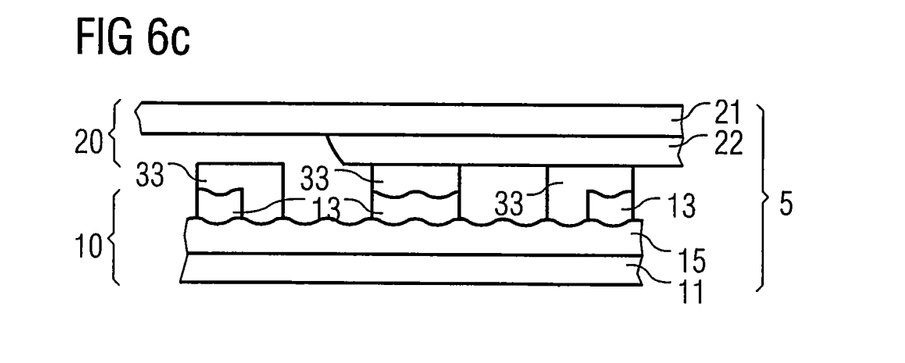
Figure 6D:
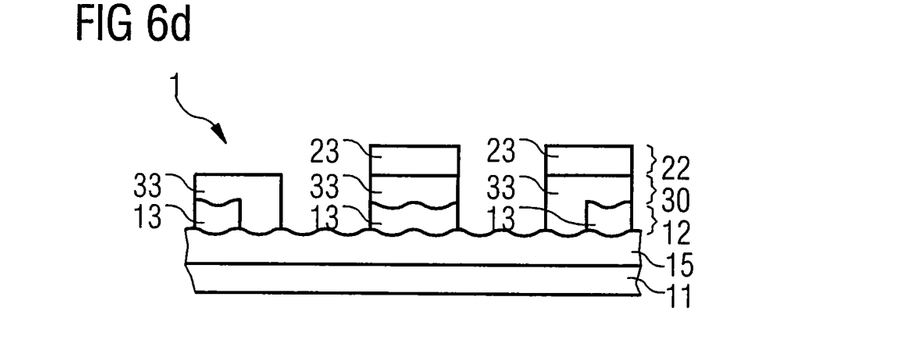

FIGS. 6a to 6d show the production of a further embodiment of a security element 1 according to the invention. In FIG. 6a there is depicted a section through the first security-element partial element 10. It consists of the first carrier substrate 11, an embossing lacquer layer 15 with a diffractive structure 15' and a first functional layer 12, consisting of a metallization, which covers partial areas of the embossing lacquer layer 15. There is applied to the metallization 12 a colored resist lacquer 30, whereby the resist lacquer areas 33 partly overlap the metallized areas 12, i.e. the resist lacquer is located partly on the metallization and partly directly on the embossing lacquer layer. When the metallization not protected by resist areas 33 is removed, there is obtained the security-element partial element which is shown in FIG. 6b. In plan view (through the carrier substrate 11) the viewer will recognize a hologram (first functional areas 13 with the diffractive structure) and additionally colored areas (caused by the colored resist 33). The resist areas 33 can now be additionally bonded to a further ink layer, as depicted in FIG. 6c. FIG. 6c shows how a second security-element partial element, consisting of a carrier substrate 21 which is coated partially with an ink layer 22, is bonded to the security-element partial element from FIG. 6b. After removal of the foil 21 there is obtained the security element with the structure shown in FIG. 6d. A viewer regarding the security element depicted in FIG. 6d in the transmitted-light view will recognize sharply contoured lines with gaps therebetween. In the front incident-light view (through the foil 11) there are to be recognized the hologram motif and additionally colored areas, as described above for FIG. 6b. In the back incident-light view, the metallized areas 13 are no longer to be recognized, because they are covered exactly by colored resist or additionally by the colored second functional areas 23. Hence, from this side one will recognize a multicolored motif in the colors of the resist and of the second functional layer. The second functional layer can of course form a multicolored motif, so that the recognizable overall motif has more than two colors. Also, there can be used resist lacquers of different colors, which likewise permits a very great number of different-colored motifs, which considerably increases the forgery resistance.

Figure 7A:
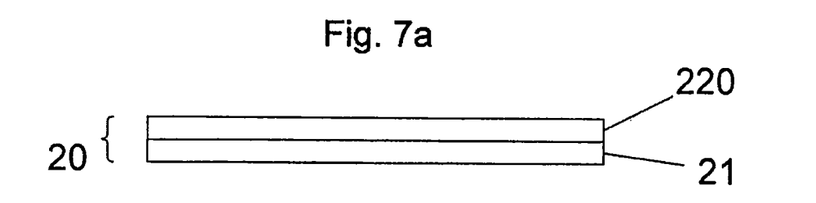

FIG. 7 illustrates an alternative method sequence in the production of a security element 1 according to the invention in which, instead of the second security-element partial element 20 shown in FIG. 2c, there is employed the second security-element partial element 20 shown in FIG. 7a.

FIG. 7a shows a section through the second security-element partial element which is to be combined with the first security-element partial element 10 shown in FIG. 2b. The second security-element partial element 20 shown in FIG. 7a is a metal donor foil without embossing which has a second carrier substrate 21 and a metallization 220 generated thereon.

Figure 7B:
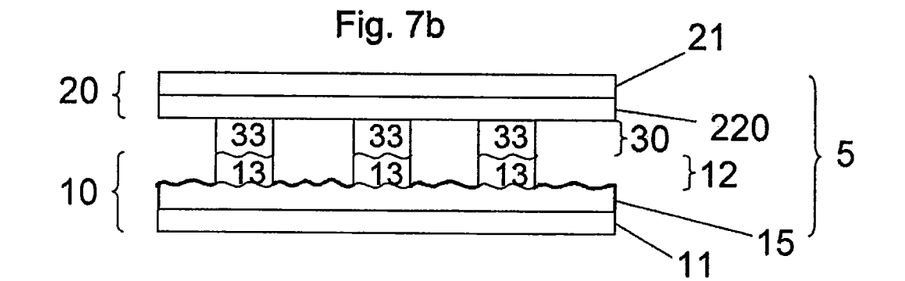

FIG. 7b shows how the first security-element partial element 10 from FIG. 2b and the second security-element partial element 20 from FIG. 7a are assembled to a composite 5.

Figure 7C:
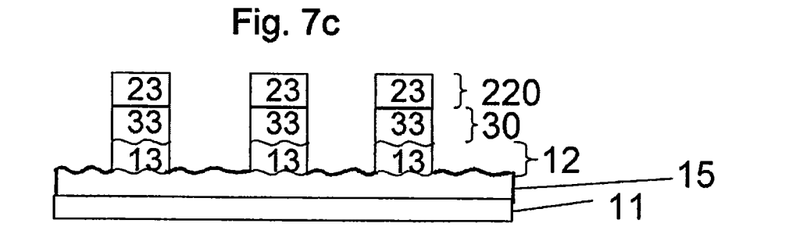

After bonding, the second carrier substrate 21 is removed, for example by separation winding. The result is shown in FIG. 7c. Bonded to the first security-element partial element 10 were only the areas 23 of the metallization 220 that were in contact with resist areas 33. These areas are areas 23 suitable for forming diffractive structures and constituting an exact reproduction of the pattern of the resist areas 33. The remaining areas of the metallization 220 were removed together with the second carrier substrate, while the areas 23 of the metallization 220 bonded to the resist areas 33 were removed from the carrier substrate.

Figure 7D:
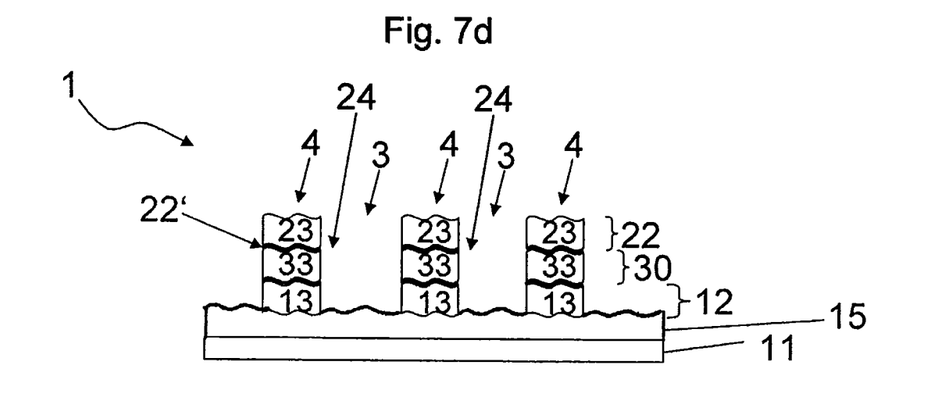

Subsequently, the areas 23 depicted in FIG. 7c that are suitable for forming diffractive structures are formed into metallized diffractive structures for example by embossing. The result is shown in FIG. 7d. The lines 4 are in each case the carrier of a diffractive structure. The diffractive structures can be for example hologram structures, whereby different hologram structures are preferably present in the first functional areas 13 and the second functional areas 23.

The method according to the invention permits an exactly registered and sharp-edged formation of extremely fine structures with a width or a diameter of about 50 µm or less.

Finally, some special embodiments of the present invention will also be explained.

Hereinabove the present invention was always described in connection with a transparent or translucent first carrier substrate. Alternatively, there can also be employed an opaque first carrier substrate, although this causes the negative writing to be poorly recognizable, and also only one of the two incident-light views to be well recognizable, namely, the view designated hereinabove as the back incident-light view. Hence, an opaque carrier substrate 11 is less preferable.

According to a further variant, it is possible to do without the formation of gaps 14 in the first functional layer 12, i.e. to bond the first security-element partial element 10 in the form shown for example in FIG. 2a to the second security-element partial element 20. In this case, the pattern of the resist layer 30 is exactly reproduced only in the second functional layer 22, which, however, can likewise lead to very satisfactory results with readily visible negative writing, for example when the first functional layer 12 is configured as transparent ink.

According to a further variant, a first security-element partial element 10 with congruent first functional areas 13 and resist areas 33 can be bonded to a second security-element partial element 20 whose second functional layer 22 already has a pattern which, however, does not match the pattern of the first functional layer 13 and of the resist areas 33. Considering, for illustration, a case where the first functional areas 13 and the resist areas 33 form a line pattern as in FIG. 1a, there being effected a bonding to a second functional layer 22 which has a line pattern of parallel lines perpendicular thereto, the result is a security element 1 with punctiform second functional areas 23. The second functional areas 23 are then "lined up" like beads on a string on the lines formed by the first functional areas. In a plan view of the second functional areas the viewer will recognize lines with points.

Further variation possibilities result when the first functional layer 12, the resist layer 30, and the second functional layer 22 all have different patterns. As an example there will now be considered the case where the first security-element partial element 10 has functional areas 13 in the form of circular concentric lines. The first functional layer 12 is printed with a resist layer 30 in the form of parallel straight lines 33. Bonded thereto is a second security-element partial element 20 in whose second functional layer 22 there is formed a pattern of functional areas 23 in the form of likewise parallel straight lines which form an angle with the resist area lines 33. The second functional areas 23 bond to the first security-element partial element 10 in the areas where they come to lie over resist areas 33. In a plan view of the second functional layer, a viewer will then see, after detachment of the second carrier substrate 21, the circular pattern of the first functional layer with punctiform areas formed by the second functional layer. When a colored resist is employed, the resist lines 33 will additionally be recognizable.

All security elements according to the invention have in common that two of their functional layers are bonded together directly by means of a resist, whereby at least the pattern of one functional layer, preferably also the pattern of the other functional layer, is caused at least partly by the pattern of the resist layer.

The security elements according to the invention can be supplied in the form of transfer materials, i.e. foils or bands with a multiplicity of finished security elements prepared for transfer. In the case of a transfer material, the layer structure of the later security element is prepared on a carrier material in the reverse order in which the layer structure is later to be present on an object of value to be secured, whereby the layer structure of the security element can be prepared on the carrier material in endless form or already in the final outline form employed as the security element. The transfer of the security element to the object of value to be secured is effected using an adhesive layer, which is typically provided on the transfer material, but can also be provided on the object of value. Preferably there is employed therefor a hot-melt adhesive. When the security element is prepared in endless form, there can be provided, for transfer, an adhesive layer either only in the areas of the security element to be transferred, or the adhesive is activated only in the areas to be transferred. The carrier material of the transfer elements is usually removed from the layer structure of the security elements during or after their transfer to the object of value. To facilitate stripping, there can be provided a separating layer (release layer) between the carrier material and the part of the security elements to be stripped. Optionally the carrier material can also remain on the transferred security element.

The security elements according to the invention can be employed for securing the authenticity of goods of any kind. Preferably they are used for securing the authenticity of value documents, for example in bank notes, checks or identification cards. They can be arranged here on a surface of the value document or be embedded wholly or partly in the value document. Especially advantageously they are used in value documents with a hole, for covering the hole. In this case, the advantages of the security elements according to the invention with transparent carrier substrates and carefully registered motifs to be viewed from both sides of the value document can be appreciated especially nicely. Negative writing with extremely fine structures and subpatterns can also be clearly recognized in transmitted light. It is practically impossible to imitate by a forger in the precision attainable according to the invention. It is also practically impossible to strip the security elements in order to transfer them to another object of value, because the security elements according to the invention always contain at least two adhesive layers, i.e. they contain an adhesive resist layer and are connected with an adhesive layer to the object of value to be secured. When there is employed for bonding the security element to the object of value an adhesive that is similar in its chemical and physical properties to the resist lacquer in the layer structure of the security element, the layer structure of the security element will always be destroyed in stripping attempts.

The invention claimed is:

1. A method for producing a security element with negative writing for a security paper or an object of value such as a value document, comprising the steps:
   a) producing a first security-element partial element by
      supplying a first transparent or translucent carrier substrate,
      applying a first functional layer to the first carrier substrate or to a previously applied intermediate layer,
      applying a resist layer to the first functional layer
      in the form of a predetermined pattern with resist areas and gaps between the resist areas,
         removing the areas of the first functional layer not protected by resist areas in order to form first functional areas and first gaps therebetween,
   b) producing a second security-element partial element by
      supplying a second carrier substrate,
      applying a second functional layer to the second carrier substrate or to a previously applied intermediate layer,
   c) assembling the first and the second security-element partial elements to a composite such that the resist layer and the second functional layer face each other, and bonding the first and the second security-element partial elements, and
   d) detaching the second carrier substrate from the bonded composite, whereby the second functional layer adheres to the resist areas so as to form second functional areas, while the remaining areas of the second functional layer are detached together with the second carrier substrate, thereby forming in the second functional layer second gaps which, together with the gaps in the resist layer and the first gaps in the first functional layer, form the negative writing.

2. The method according to claim 1, wherein the first security-element partial element is produced by
   supplying the first carrier substrate,
   applying a first embossing lacquer layer as an intermediate layer to the first carrier substrate,
   applying a first metallization as the first functional layer to the first embossing lacquer layer,
   embossing the first embossing lacquer layer before or after applying the first metallization,
   applying the resist layer to the first metallization, whereby the resist layer has resist areas and gaps, or resist areas and gaps are formed therein, and
   forming first gaps in the first metallization by removing the areas of the first metallization not protected by resist areas.

3. The method according to claim 1, wherein the second security-element partial element is produced by
   supplying the second carrier substrate,
   applying a second embossing lacquer layer as an intermediate layer to the second carrier substrate,
   applying a second metallization as the second functional layer to the second embossing lacquer layer,
   embossing the second embossing lacquer layer before or after applying the second metallization.

4. The method according to claim 1, wherein as the first functional layer and/or as the second functional layer there is applied an ink layer, said ink layer being multicolored or not multicolored.

5. The method according to claim 1, wherein the first functional layer and/or the second functional layer is (are) applied only in partial areas, and the process of bonding the first and the second security-element partial elements and detaching the second carrier substrate is carried out successively with at least two second security-element partial elements, thereby forming different second functional areas in the second functional layer of the security element.

6. The method according to claim 1, wherein the resist areas are formed as lines of a defined width y.

7. The method according to claim 1, wherein the resist layer is applied as a pattern in which the resist areas and the gaps form a subpattern as well.

8. The method according to claim 7, wherein the resist areas are formed as lines of a defined width y, and the subpattern is generated by varying the width y of the lines.

* * * * *